United States Patent [19]

Ishikawa et al.

[11] Patent Number: 5,040,114

[45] Date of Patent: Aug. 13, 1991

[54] METHOD OF CONTROLLING CONTINUOUSLY VARIABLE TRANSMISSION IN COMBINATION WITH ENGINE THROTTLE CONTROL

[75] Inventors: Yoshikazu Ishikawa; Kouji Yamaguchi, both of Saitama, Japan

[73] Assignee: Honda Giken Kogyo Kabushiki Kaisha, Tokyo, Japan

[21] Appl. No.: 383,327

[22] Filed: Jul. 20, 1989

[30] Foreign Application Priority Data

Jul. 20, 1988 [JP] Japan ............... 63-180649

[51] Int. Cl.$^5$ ............ B60K 41/16; B60K 41/18; F16H 5/40; F16H 39/44
[52] U.S. Cl. ............ 364/424.1; 74/866; 74/868
[58] Field of Search ........... 364/424.1; 74/862, 866, 74/867; 474/12, 18, 28

[56] References Cited

U.S. PATENT DOCUMENTS

| | | | |
|---|---|---|---|
| 4,232,572 | 11/1980 | Ross et al. | 74/859 |
| 4,291,594 | 9/1981 | Baudoin | 74/857 |
| 4,383,456 | 5/1983 | Ganoung | 74/866 |
| 4,387,608 | 6/1983 | Mohl et al. | 74/866 |
| 4,395,199 | 7/1983 | Izumi et al. | 417/53 |
| 4,428,257 | 1/1984 | Meyerle et al. | 74/866 |
| 4,459,806 | 6/1984 | Falk | 60/327 |
| 4,507,986 | 4/1985 | Okamura et al. | 74/866 |
| 4,515,040 | 5/1985 | Takeuchi et al. | 74/866 |
| 4,589,302 | 5/1986 | Oda et al. | 74/866 |
| 4,627,311 | 12/1986 | Yokooku et al. | 74/866 |
| 4,637,279 | 1/1987 | Itoh et al. | 74/866 |
| 4,671,138 | 6/1987 | Nobumoto et al. | 74/862 |
| 4,699,025 | 10/1987 | Omitsu | 74/866 |
| 4,701,853 | 10/1987 | Osanai | 364/424.1 |
| 4,704,683 | 11/1987 | Osanai | 364/424.1 |
| 4,720,793 | 1/1988 | Watanabe et al. | 364/424.1 |
| 4,735,114 | 4/1988 | Satoh et al. | 74/866 |
| 4,753,133 | 6/1988 | Itoh et al. | 74/866 |
| 4,764,155 | 8/1988 | Kumura et al. | 474/12 |
| 4,817,469 | 4/1989 | Shigematsu et al. | 74/866 |
| 4,852,429 | 8/1989 | Künzer et al. | 74/866 |
| 4,893,526 | 1/1990 | Tokoro | 74/866 |
| 4,949,596 | 8/1990 | Iino et al. | 74/866 |
| 4,962,679 | 10/1990 | Ishikawa et al. | 74/866 |

FOREIGN PATENT DOCUMENTS

| | | | |
|---|---|---|---|
| 61-8305 | 3/1986 | Japan | 364/424.1 |
| 63-53343 | 3/1988 | Japan | 364/424.1 |
| 63-53344 | 7/1988 | Japan . | |
| 1-93662 | 4/1989 | Japan | 364/424.1 |

Primary Examiner—Felix D. Gruber
Attorney, Agent, or Firm—Lyon & Lyon

[57] ABSTRACT

A time-dependent engine output power characteristic curve for an engine output power to vary therealong to a target value which corresponds to an indication of intention of the driver for acceleration or deceleration (e.g., the amount of depression of the accelerator pedal) is established based on the difference between a target engine output power and an actual engine output power. Then, a target rate of change of the rotational speed of the engine and a target rate of change of an indication of an engine load are established so that the actual engine output power varies along the engine output power characteristic curve, and the throttle valve and the continuously variable transmission are controlled using the target rates thus established.

15 Claims, 15 Drawing Sheets

METHOD OF CONTROLLING CONTINUOUSLY VARIABLE TRANSMISSION IN COMBINATION WITH ENGINE THROTTLE CONTROL

BACKGROUND OF THE INVENTION

The present invention relates to a method of controlling a continuously variable transmission on a motor vehicle or the like, and more particularly to a method of controlling a continuously variable transmission in combination with the control of the throttle valve of an engine.

Heretofore, continuously variable transmissions have generally been controlled such that (a): the rotational speed of an engine coupled to the continuously variable transmission will reach a target speed, (b): the rate of change of the rotational speed of the engine will reach a target rate, and (c): the speed reduction ratio or transmission ratio of the transmission will reach a target ratio.

According to another method of controlling a continuously variable transmission, the rate of change of a speed reduction ratio is controlled, the rate being calculated as the sum of a component corresponding to a predicted acceleration that is calculated from the reserved power (the power which is available but not used) of an engine coupled to the transmission and a component corresponding to a target rate of change of the engine rotational speed (see, for example, Japanese Laid-Open Patent Publication No. 63-53343 and Japanese Patent Application No. 62-249590, both of which were filed by the applicant).

There is also known a method of simultaneously controlling a continuously variable transmission and a throttle valve of an engine coupled to the continuously variable transmission, so that the engine and a system for actuating the continuously variable transmission will be controlled to operate the engine at a minimum fuel consumption rate (see Japanese Patent Publication No. 61-8305, for example).

The conventional control methods described above do not present a problem insofar as the motor vehicle runs steadily or is gradually accelerated or decelerated. However, when the motor vehicle runs transiently, such as when the accelerator pedal is abruptly depressed to accelerate the motor vehicle, the rate of change of a controlled value until it reaches a target value may not necessarily best match the demand of the driver of the motor vehicle. Accordingly, under transient running conditions of the motor vehicle, the driver may not experience optimum feelings as to the driving conditions of the motor vehicle.

SUMMARY OF THE INVENTION

In view of the aforesaid problems of the conventional continuously variable transmission control methods, it is an object of the present invention to provide a method of controlling a continuously variable transmission on a motor vehicle to enable the motor vehicle to run in a manner to give the driver a better driving feeling, by recognizing an indication of the driver's will or intention for acceleration or deceleration, such as the amount of depression of an accelerator pedal, as a demand for an increase or decrease in the engine output power.

According to the control method of the present invention, a time-dependent engine output power characteristic curve for engine output power to vary therealong to a target value which corresponds to an indication of the intention of the driver for acceleration or deceleration (e.g., the amount of depression of the accelerator pedal) is established based on the difference between a target engine output power and an actual engine output power. Then, a target rate of change of the rotational speed of the engine and a target rate of change of an engine load are established so that the actual engine output power varies along the engine output power characteristic curve, and the throttle valve and the continuously variable transmission are controlled using the target rates thus established.

When the actual engine output power deviates from the engine output power characteristic curve and the continuously variable transmission is insufficiently controlled, the throttle valve is controlled to correct such a deviation. When the actual engine output power deviates from the engine output power characteristic curve and the throttle valve is insufficiently controlled, the continuously variable transmission is controlled to correct such a deviation.

When the accelerator pedal is operated, for example, a demand of the driver for an output power characteristic as expressed by the operation of the accelerator pedal is directly recognized as a demand for an increase or decrease in the engine output power. The transmission can appropriately be controlled in a manner to meet the demand of the driver. The engine output power characteristic curve is selected to provide the motor vehicle with a running performance matching a driver's feeling and achieving good fuel economy.

Further scope of the applicability of the present invention will become apparent from the detailed description given below. However, it should be understood that the detailed description and specific examples, indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention and wherein.

DETAILED DESCRIPTION OF THE PREFERRED EMBODIMENT

Figure 1:
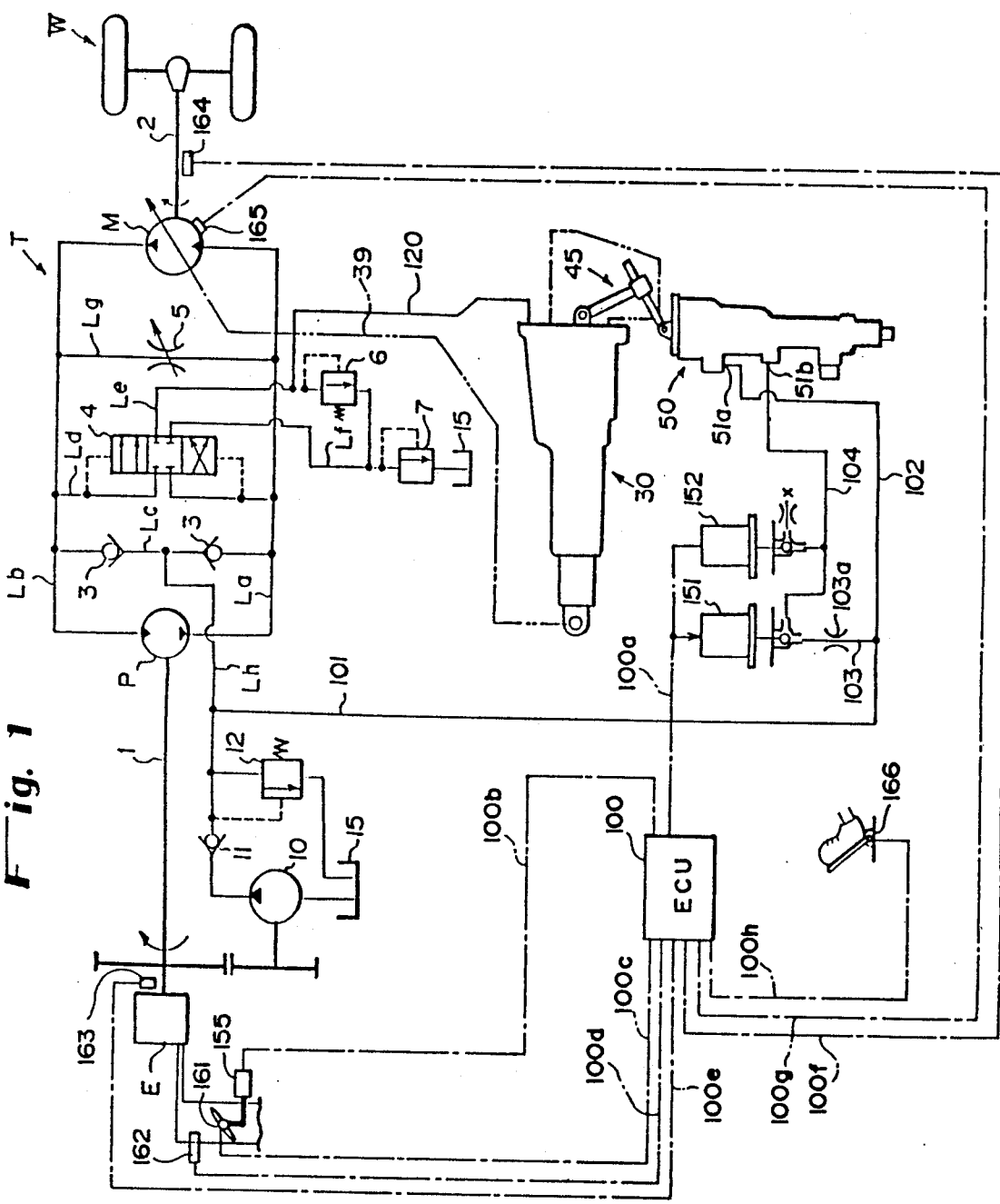
FIG. 1 is a circuit diagram of a hydraulic circuit of a continuously variable transmission to be controlled by a method of the present invention.

FIG. 1 shows a hydraulic circuit of a continuously variable transmission which is to be controlled by a control method according to the present invention. The continuously variable transmission, generally designated by the reference numeral; T, has a fixed-displacement hydraulic pump P drivable by an engine E on a motor vehicle through an input shaft 1 and a variable-displacement hydraulic motor M having an output shaft 2 for driving road wheels W of the motor vehicle. The hydraulic pump P and the hydraulic motor M are hydraulically connected to each other through a closed hydraulic circuit including a first oil passage La interconnecting the outlet port of the pump P and the inlet port of the motor M and a second oil passage Lb interconnecting the inlet port of the pump P and the outlet port of the motor M.

A charging pump 10 drivable by the engine E has an outlet port connected to the closed hydraulic circuit through a charging oil passage Lh having a check valve 11 and a third oil passage Lc having a pair of check valves 3. Working oil supplied from an oil sump 15 by the charging pump 10 and regulated in pressure by a charging pressure relief valve 12 is supplied through one of the check valves 3 to a lower-pressure one of the oil passages La, Lb. To the closed hydraulic circuit, there is also connected a fourth oil passage Ld having a shuttle valve 4 coupled to fifth and sixth oil passages Le, Lf having higher- and lower-pressure relief valves, 6, 7 and connected to the oil sump 15. The shuttle valve 4 which comprises a two-port three-position directional control valve is operable in response to the difference between oil pressures in the first and second oil passages La, Lb for connecting a higher-pressure one of the first and second oil passages La, Lb to the fifth oil passage Le and the lower-pressure oil passage to the sixth oil passage Lf. Therefore, the oil pressure relieved from the higher-pressure oil passage is regulated by the higher-pressure relief valve 6. Whereas the oil pressure relieved from the lower-pressure oil passage is regulated by the lower-pressure relief valve 7.

Between the first and second oil passages La, Lb, there is connected a seventh oil passage Lg having a clutch valve 5 which comprises a variable restriction controlled by an opening control unit (not shown) for controlling the opening of the seventh oil passage Lg. The transmission of the drive power from the hydraulic pump P to the hydraulic motor M can be controlled by controlling the cross-sectional flow area in the clutch valve 5.

An actuator for controlling the displacement of the hydraulic motor M to control the speed reduction ratio or transmission ratio of the continuously variable transmission comprises a pair of first and second servovalves 30, 50 mechanically operably coupled to each other by a link mechanism 45. The hydraulic motor M comprises a swash-plate type axial-piston motor whose displacement can be controlled by controlling the angle of the swash plate thereof.

The structure and operation of the servovalves 30, 50 will be described below with reference to FIGS. 1 and 2.

The higher-pressure working oil supplied from the closed hydraulic circuit of the continuously variable transmission T through the shuttle valve 4 to the fifth oil passage Le is introduced to the first servovalve 30 through a high-pressure line 120 branched from the fifth oil passage Le. The first servovalve 30 controls the swash plate angle of the hydraulic motor M by employing the higher-pressure working oil thus introduced. The second servovalve 50 controls operation of the first servovalve 30 through the link mechanism 45 by which the second servovalve 50 is operatively coupled to the first servovalve 30.

The first servovalve 30 comprises a housing 31 having a port 31a connected to the high-pressure line 120, a piston member 32 slidably disposed in the housing 31, and a spool member 34 coaxially slidably disposed in the piston 32. The piston member 32 has a piston 32a on its righthand (as shown) end, and a cylindrical rod 32b extending coaxially from the piston 32a is positioned in a cylinder hole 31c defined in the housing 31 and the piston 32a divides the space of the cylinder hole 31c into left and right (as shown) cylinder chambers 35, 36. The rod 32b is slidably fitted in a rod hole 31d smaller in diameter than and extending coaxially from the cylinder hole 31c. The right cylinder chamber 35 is closed by a plug 33a and a cover 33b. The spool member 34 extends through the piston 32a, the right cylinder chamber 36, the plug 33a, and the cover 33b.

The left cylinder chamber 35 communicates with the high-pressure line 120 through an oil passage 31b defined in the housing 31. The piston member 32 can therefore be moved to the right under the oil pressure introduced from the high-pressure line 120 into the left cylinder chamber 35.

The spool member 34 has on its distal end a land 34a closely fitted in a spool hole 32d. The spool member 34 also has a recess 34b defined on the righthand side of the land 34a by a pair of diametrically opposite cutouts, the recess 34b having a predetermined axial dimension. A retaining ring 37 is fitted over the spool member 34 on the righthand side of the recess 34b. The spool member 34 is prevented from removal from the piston member 32 by the retaining ring 37 upon engagement with another retaining ring 38 locked in an inner peripheral surface of the piston member 32.

The piston member 32 has defined therein a discharge passage 32e for opening the right cylinder chamber 36 into communication with the left cylinder chamber 35 through the recess 34b upon leftward movement of the spool member 34.

Figure 2:
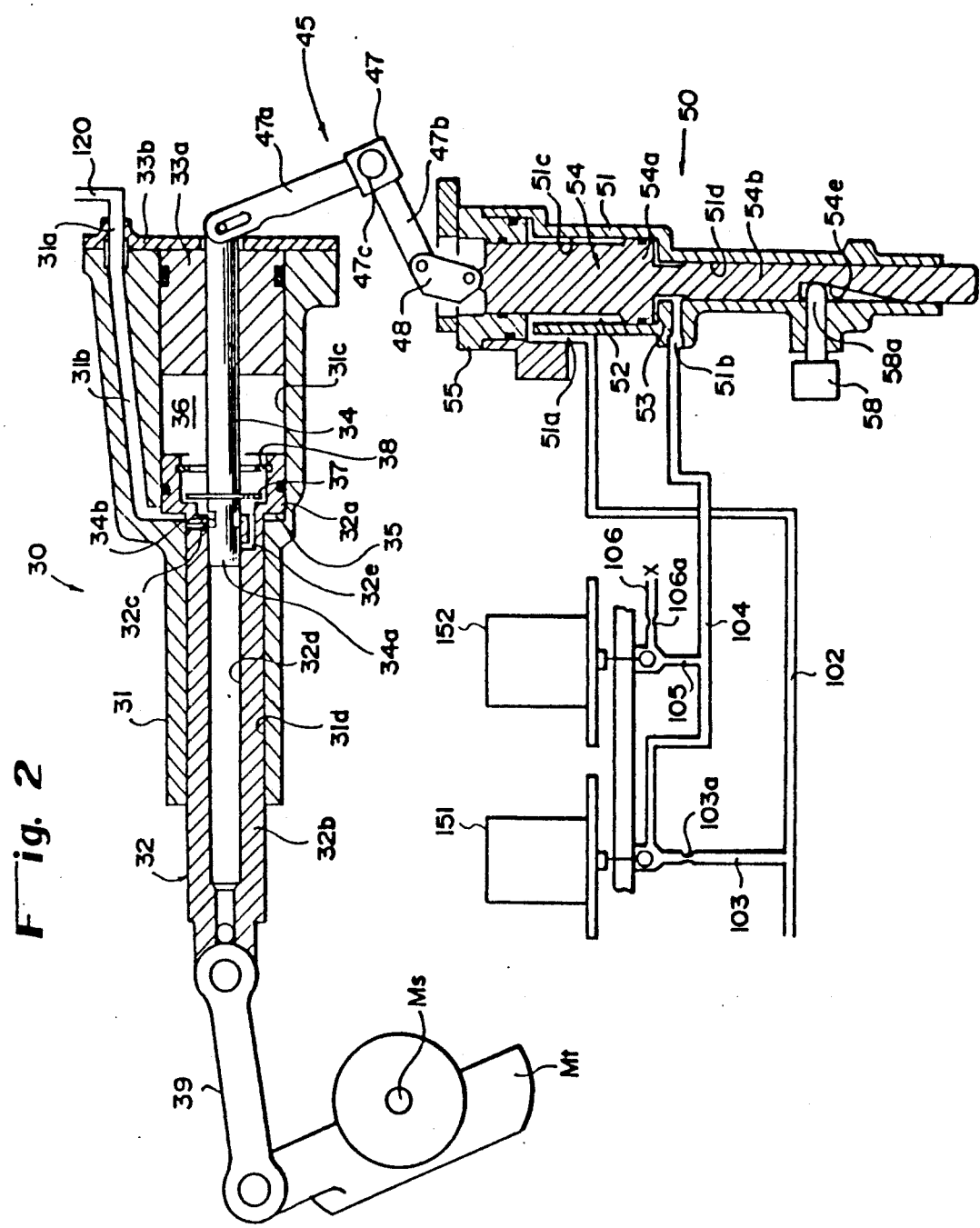
FIG. 2 is a cross-sectional view of servovalves for controlling the continuously variable transmission.

When the spool member 34 is moved to the right from the position shown in FIG. 2, the land 34a closes the communication passage 32c and opens the discharge passage 32e. Therefore, the oil supplied under pressure from the high-pressure line 120 through the oil passage 31b acts in only the left cylinder chamber 35, thus moving the piston member 32 to the right in follow-up action with the spool member 34.

When the spool member 34 is then moved to the left, the recess 34b opens the communication passage 32c into the right cylinder chamber 36, and the land 34a closes the discharge chamber 32e. The high-pressure oil rom the high-pressure line 120 then acts in both the left and right cylinder chambers 35, 36. Since the piston 32a has different pressure-bearing surface areas on its axially opposite sides, i.e., the righthand pressure-bearing surface area is greater than the lefthand pressure-baring surface area, the piston 32 is moved to the left in a follow-up action with the spool member 34.

When the spool member 34 is stopped somewhere in its stroke, since the oil pressures in the cylinder chambers 35, 36 are maintained in equilibrium, the piston member 32 is in a hydraulically balanced condition and is also stopped.

Therefore, by moving the spool member 34 to the left or right, the piston member 32 is moved in follow-up unison with the spool member 34 under the pressure of the oil supplied from the high-pressure line 120. The piston member 32 then causes a link 39 coupled thereto to turn the swash plate Mt of the hydraulic motor M about a shaft Ms for thereby varying the displacement of the hydraulic motor M.

The spool member 34 is operatively coupled to the second servovalve 50 by the link mechanism 45. The link mechanism 45 comprises a first link 47 rotatable about a shaft 47c and having two substantially perpendicular arms 47a, 47b, and a second link 48 joined by a pin to the lower distal end of the arm 47b of the first link 47. The upper end of the arm 47a is connected by a pin to the righthand end of the spool member 34 of the first servovalve 30. The lower end of the second link 48 is coupled by a pin to a vertical (as shown) spool member 54 of the second servovalve 50. Consequently, vertical movement of the spool member 54 of the second servovalve 50 causes the spool member 34 of the first servovalve 30 to move to the left or right.

The second servovalve 50 has a housing 51 having two ports, 51a, 51b to which two oil pressure lines 102, 104 are connected, respectively, and the spool member 54 is vertically slidably disposed in the housing 51. The spool member 54 comprises a piston 54a and a rod 54b extending coaxially downwardly from the piston 54a. The piston 54a is slidably fitted in a cylinder hole 51c defined vertically in the housing 51. The cylinder hole 51c is closed by a cover 55, defining a cylinder chamber therein which is divided by the piston 54a into upper and lower cylinder chambers 52, 53. The rod 54 is slidably fitted in a rod hole 51d defined coaxially in the housing 51 and extending downwardly from the cylinder hole 51c.

The rod 54b has a recess 54e defined in a peripheral surface and has a tapered surface thereon. A top position detector switch 58 has a spool 58a projecting into the recess 54e. When the spool member 54 moves upwardly, the spool 58a is lifted in a direction away from the rod 54b as the tip end of the spool 58a slides up the tapered surface. Therefore, the top position detector switch 58 can detect whether the transmission ratio of the hydraulic motor M is minimum.

The upper and lower cylinder chambers 52, 53 defined by the piston 54a communicate respectively with the oil pressure lines 102, 104 through the ports 51a, 51b. The spool member 54 is moved upwardly or downwardly depending on the magnitude of an oil pressure applied to the piston 54a, the oil pressure being determined by the pressure of working oil supplied through the lines 102, 104, and the pressure-bearing surface areas of the piston 54ak in the cylinder chambers 52, 53. The vertical movement of the spool member 54 is transmitted through the link mechanism 47 to the spool member 34 of the first servovalve 30 thereby to move the spool member 34 to the left or right. Accordingly, by controlling the oil pressure supplied through the oil pressure lines 102, 104, the movement of the spool member 34 of the first servovalve 30 can be controlled to move the piston member 32 for thereby controlling the swash plate angle of the hydraulic motor M, so that the displacement of the motor M will be controlled to control the transmission ratio or speed reduction ratio. Specifically, when the spool member 54 of the second servovalve 50 is moved upwardly, the piston member 32 of the first servovalve 30 is moved to the right to reduce the swash plate angle of the hydraulic motor M for reducing the displacement of the motor M and hence the speed reduction ratio.

Oil pressure which is supplied to the upper cylinder chamber 52 through the port 51a from the oil pressure line 102 is introduced from the charging pump 10, while being regulated by the charging pressure relief valve 12, through an oil pressure line 101. Oil pressure which is supplied to the lower cylinder chamber 53 through the port 51b is introduced from an oil pressure line 104 branched from the oil pressure line 102 and having an orifice 103a, while being regulated by two duty-ratio-controlled solenoid-operated valves 151, 152, through an oil pressure line 104. The solenoid-operated valve 151 is opened and closed depending on a given duty ratio to control the rate of flow of working oil from the oil pressure line 103 to the oil pressure line 104. The solenoid-operated valve 152 is connected between an oil pressure line 105 branching from the oil pressure line 104 and an oil pressure line 106 connected to a drain through an orifice 106a. The solenoid-operated valve 152 is opened and closed depending on a given duty ratio to control the rate of flow of working oil from the oil pressure line 104 to the drain.

Therefore, the upper cylinder chamber 52 is supplied through the oil pressure line 102 with the charging oil pressure which has been regulated by the charging pressure relief valve 12. The oil pressure line 104 supplies the lower cylinder chamber 53 with an oil pressure which is made lower than the charging oil pressure by the two solenoid-operated valves 151, 152. Since the pressure-bearing surface area of the upper cylinder chamber 52 is smaller than the pressure-bearing surface of the lower cylinder chamber 53, the forces acting on the opposite sides of the spool member 54 under the oil pressures in the upper and lower cylinder chambers 52, 53 are brought into equilibrium when the oil pressure Pu in the upper cylinder chamber 52 is higher than a certain level Pl of the oil pressure in the lower cylinder chamber 53 (Pu>Pl). Therefore, by controlling the solenoid-operated valves 151, 152 to increase the oil pressure supplied to the lower cylinder chamber 53 above the pressure level Pl, the spool member 54 is moved upwardly to reduce the swash plate angle of the hydraulic motor M for thereby reducing the speed reducing ratio.

The solenoid-operated valves 151, 152 are controlled by a control signal fed from a controller 100 over a signal line 100a. The controller 100 may include memory, as is well-known in the art.

As shown in FIG. 1, the controller 100 supplied with a throttle valve opening signal $\theta_{RH}$ applied from an engine throttle valve opening sensor 161 over a signal line 100c, an intake vacuum signal $P_B$ delivered over a signal line 100d from a vacuum sensor 162 which detects the intake vacuum in an intake manifold, an engine rotational speed signal N delivered from an engine rotational speed sensor 163 over a signal line 100e, a vehicle speed signal V delivered over a signal line 100f from a vehicle speed sensor 164 which detects the vehicle speed based on the rotational speed of the output shaft 2, a swash plate angle signal $\theta_{sw}$ delivered over a signal line 100g from a swash plate angle sensor 165 which detects the swash plate angle of the hydraulic motor M, and an accelerator opening signal $\theta_{AP}$ delivered from an accelerator pedal movement sensor 166 over a signal line 100h. The controller 100 produces a control signal based on the above input signals applied thereto and applies the control signal to the solenoid-operated valves 151, 152 to achieve desired running performance of the motor vehicle.

The controller 100 also sends a control signal over a line 100b to a throttle valve actuator 155 which controls the opening of the throttle valve. The controller 100 produces this control signal based on the input signals for controlling operation of the throttle valve actuator 155 to achieve desired running performance of the motor vehicle.

Operation of the controller 100 to control the transmission T will be described below.

The speed reduction ratio or transmission ratio I (= input shaft rotational speed/output shaft rotational speed) of the continuously variable transmission T is expressed by:

$$i = \frac{N}{C \times V} \quad (1)$$

where N is the engine rotational speed, V is the vehicle speed, and C' is constant. The rate of change di/dt of the speed reduction ratio i is determined by differentiating the equation (1) with respect to time t, and given by the following equation (2):

$$di/dt = \frac{1}{C \times V} \times \left( dN/dt - \frac{N}{C \times V} \times C \times dV/dt \right) \quad (2)$$

where dN/dt is the rate of change of the engine rotational speed, and dV/dt is the acceleration of the motor vehicle. If the target rate of change of the engine rotational speed is indicated by dNo/dt, the predicted acceleration of the motor vehicle is dVo/dt, and C'=1/C, then the rate di/dt of change of the speed reduction ratio is given by:

$$di/dt = -C \times \frac{N}{V^2} \times dVo/dt + C \times \frac{1}{V} \times dNo/dt \quad (3)$$

Therefore, the rate di/dt of change of the speed reduction ratio is represented by the sum of a component dia/dt $(= -C \times (N/V^2) \times dVo/dt)$ corresponding to the predicted acceleration dVo/dt and a component diN/dt $(= C \times (1/V) \times dNo/dt)$ corresponding to the target rate of change dNo/dt of the engine rotational speed. The predicted acceleration dVo/dt is derived from the equations (4) through (7) given below.

The output power Pe of the engine E is expressed by:

$$Pe = Ru + Ra + Pa \quad (4)$$

Ru is the running resistance of the road surface to the motor vehicle, Ra is the resistance of air to the motor vehicle, and Pa is the reserved horsepower (the power which is available but not used at the time) of the engine E. From the equation (4), the reserved horsepower Pa of the engine E is derived as follows:

$$Pa = Pe - (Ru + Ra) \quad (5)$$

The reserved horsepower Pa can also be given by the equation (6):

$$Pa = (W + \Delta W) \times \frac{1}{g} \times dVo/dt \left( \frac{V \times 10^3}{60^2} \right) \times \frac{1}{75} \quad (6)$$

where W is the total weight of the motor vehicle, and $\Delta W$ is the total inertial weight of the engine E. From the equation (6), we et:

$$dVo/dt = Pa \times \frac{g \times 60^2}{(W + \Delta W) \times (V \times 10^3)} \times 75 \quad (7)$$

Therefore, the predicted acceleration dVo/dt can be calculated from the reserved horsepower Pa of the engine E, and the reserved horsepower Pa is determined according to the equation (5).

The target rate of change dNo/dt of the engine rotational speed is set so as to determine an increase or decrease in the engine output power as required by the driver, depending on the amount of depression of the accelerator pedal (which is an indication of the driver's will or intention for acceleration or deceleration), and also to vary the increase or decrease in the engine output power based on a power changing curve which causes the engine output power to increase or decrease in a manner to meet the driver's feeling with respect to the running performance and the requirement for fuel consumption.

A control sequence for controlling the speed reduction ratio and the throttle valve will be described below.

Figure 3:
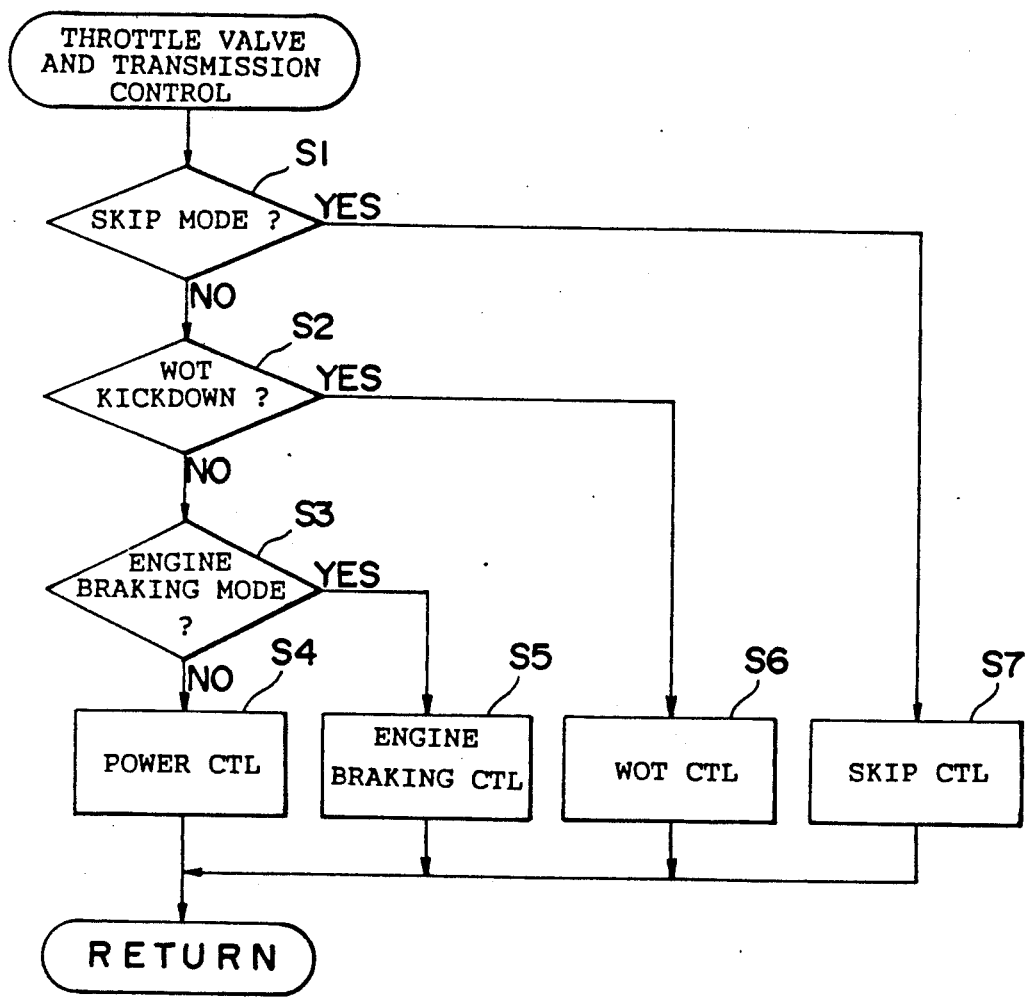
FIG. 3 is a flowchart of a main control process of the method according to the invention.

FIG. 3 shows a main control process according to the present invention. The main control process includes four control modes defined respectively in steps S4 through S7. These four control modes include a basic power control mode in a step S4, and an engine braking control mode in a step S5 which is executed when the accelerator opening is substantially fully closed so as to cause an engine braking effect, a WOT control mode in a step S6 which is executed when the accelerator opening is substantially fully opened, and a skip control mode in a step S7 which is executed at an initial stage when the accelerator opening is varied. Steps S1 through S3 in FIG. 3 determine which control mode is to be executed, and then the determined control mode is executed. The term "accelerator opening" referred to above means the degree or amount of depression of the accelerator pedal, for example, which indicates the driver's will or intention for acceleration or deceleration. When the accelerator pedal is not depressed, for example, the accelerator opening is fully closed, and when the accelerator pedal is fully depressed, the accelerator opening is fully opened.

The basic power control mode will first be described with reference to FIG. 4. In the power control mode, a time-dependent power changing curve of the engine output power is calculated and established in a step S10 depending upon the accelerator opening. A target rate of change $dN_{eO}$ of the engine rotational speed and a target rate of change $dP_{Bo}$ of the engine intake vacuum (which is an indication of the load on the engine) are set so that the engine output power will vary according to the power changing curve. The speed reduction ratio i and the engine throttle valve opening $\theta_{TH}$ are controlled based on the target rates of change $dP_{BO}$.

Figure 5:
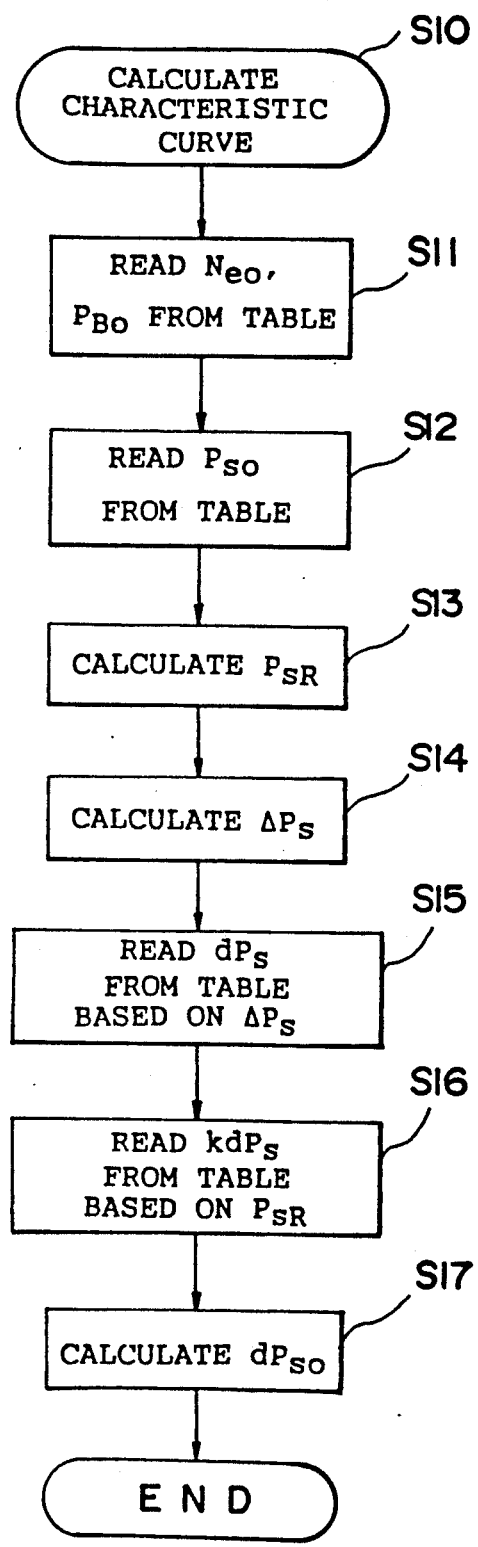

Establishment of a power changing curve of the engine output power in the step S10 will first be described with reference to FIG. 5.

Figure 6A:
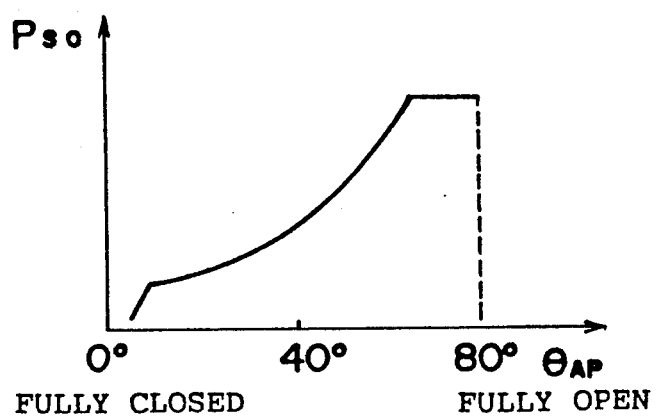
FIGS. 6A through 6F and 7A through 7D are graphs showing the characteristics of various signals used in the power control mode.
Figure 6B:
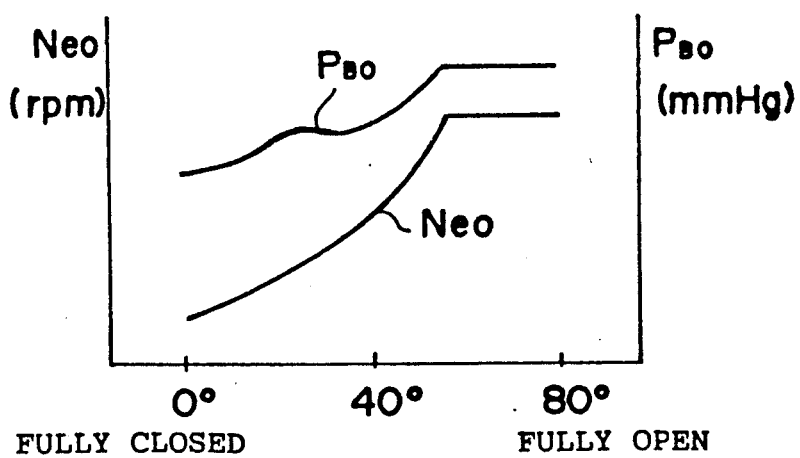

Based on the accelerator opening $\theta_{AP}$ (or the amount of depression of the accelerator pedal), the target engine output powers $P_{SO}$ have been previously set in tabular form corresponding to a curve as shown in FIG. 6A, and the target engine rotational speeds Neo and target intake vacuums $P_{Bo}$ have been previously set as shown in FIG. 6B. A target engine rotational speed Neo, a target intake vacuum $P_{BO}$, and a target engine output power Pso which correspond to the present accelerator opening $\theta_{AP}$ are read in steps S11, S12.

Figure 6C:
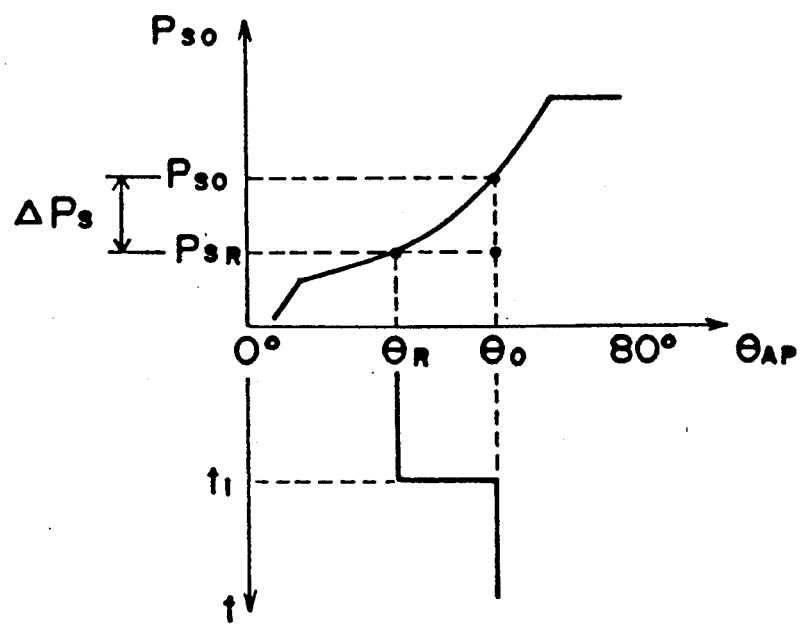

Then, an actual engine output power $P_{sR}$ is calculated from an actual engine rotational speed $N_{eR}$ and an actual intake vacuum $P_{BR}$ at this time in a step S13, which is followed by a step S14 that calculates the difference $\Delta P_s$ ($=P_{so}-P_{sR}$) between the target engine output power $P_{so}$ and the actual engine output power $P_{sR}$. The the output power difference $\Delta P_s$ is shown in FIG. 6C. More specifically, if the accelerator opening $\theta_{AP}$ is increased from $\theta_R$ to $\theta_o$ at a time $t_1$ on a time axis (extending downwardly in FIG. 6C), then the actual engine output power at this time is $P_{sR}$ corresponding to the accelerator opening $\theta_R$, but the target engine output power is $P_{so}$ corresponding to the accelerator opening $\theta_o$, with the difference therebetween being $\Delta P_s$.

Figure 6D:
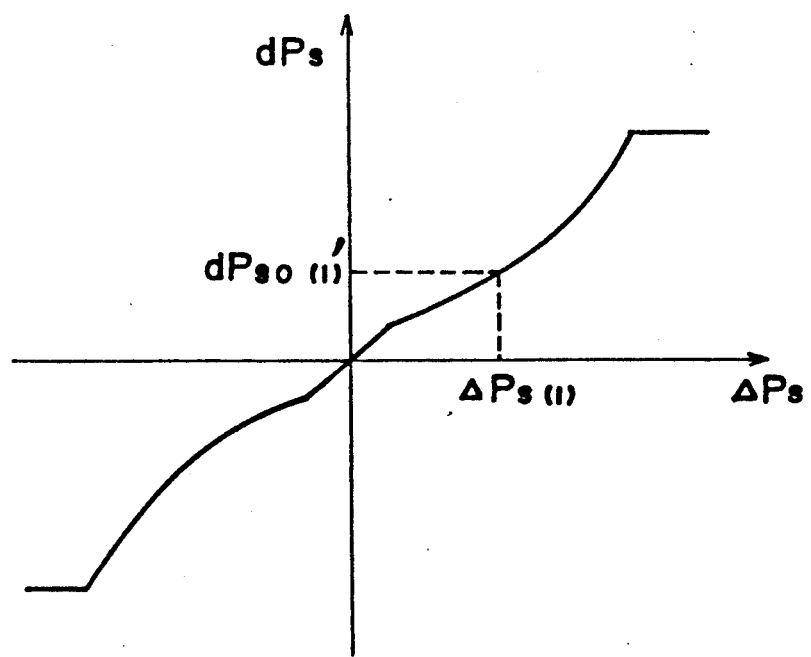

When such an output power difference $\Delta P_s$ is produced, the control process is carried out in order to eliminate the output power difference. If the output power difference $\Delta P_s$ is large, then it is preferable that the output power difference be quickly reduced at first and then be reduced gradually as the output power difference becomes smaller. The rate dPs of change of the engine output power (i.e., a change in the engine output power per a very short period of time dt) with respect to the output power difference $\Delta P_s$ have been previously set to meet the above preferred characteristic as shown in FIG. 6D. The present rate of change of the engine output power corresponding to the present output power difference $\Delta Ps$ thus determined is read from the graph of FIG. 6D in a step S15.

Figure 6E:
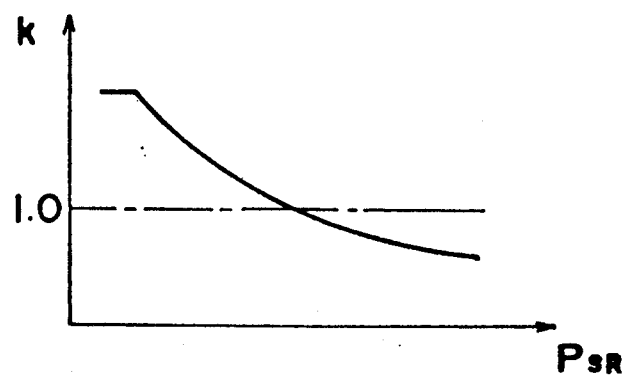

The rate of change dPs of the engine output power is determined in this manner. The engine output power is required to vary quickly so as to reach the target engine output power quickly when the engine output power is low. While when the engine output power is higher, the engine output power is required to vary slowly so as to reach the target engine output power less quickly. Therefore, as shown in FIG. 6E, a corrective coefficient k is employed which is higher than "1" when the engine output power is low and which becomes smaller when the engine output power goes higher. The rate of change dPs of the engine output power is corrected by being multiplied by the corrective coefficient k which is determined from the graph of FIG. 6E in step S16.

Then, an output power changing curve which varies from the actual engine output power $P_{sR}$ at the time $t_l$ to the target engine output power $P_{so}$ is calculated and set based on the corrected rate of change $k\times dPs$ of the engine output power in a step S17.

The calculation and setting of the output power changing curve will be described more specifically with reference to FIG. 6F. The graph of FIG. 6F has a horizontal axis representing time t and a vertical axis representing the engine output power Ps. When the output power difference between the actual engine output power and the target engine output power is indicated by $\Delta Ps(1)$ at $t_1$, the rate of change dPso(1) of the engine output power, which corresponds to the output difference $\Delta Ps(1)$, is read from the graph of FIG. 6D, and is multiplied by the corrective coefficient k to calculate the rate of change dPso(1) of the engine output power.

Figure 6F:
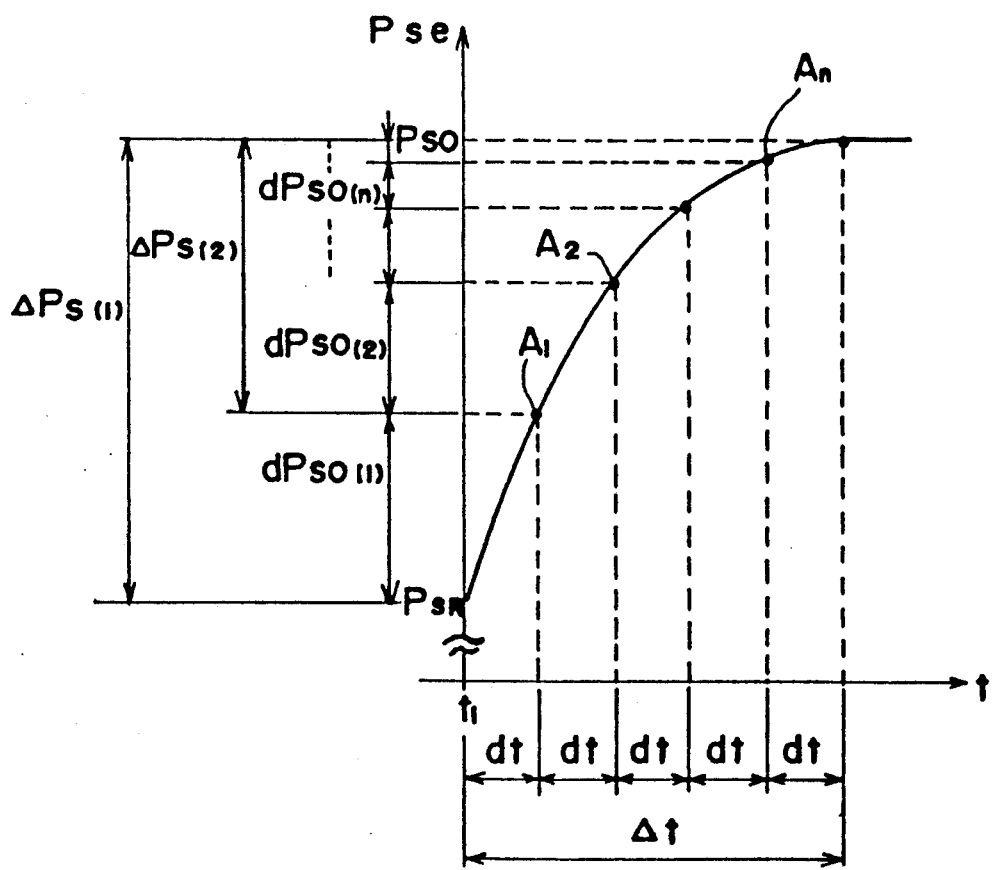

The rate dPso(1) thus determined represents a change in the engine output power per a short time dt, and a point $A_1$ corresponding to dPso(1) on the vertical axis is determined in the graph of FIG. 6F. When the engine output power is changed to the point $A_1$, the output power difference becomes $\Delta Ps(2)$, as shown in FIG. 6F. Accordingly, a rate of change dPso(2) of the engine output power is determined from the output power difference $\Delta Ps(2)$, and a next point $A_2$ is determined. An engine output power changing curve for changing the actual engine power to the target engine output power Pso then be plotted by interconnecting the points $A_1$, $A_2$, ..., $A_n$, ... which are successively determined in the above manner.

Figure 4:
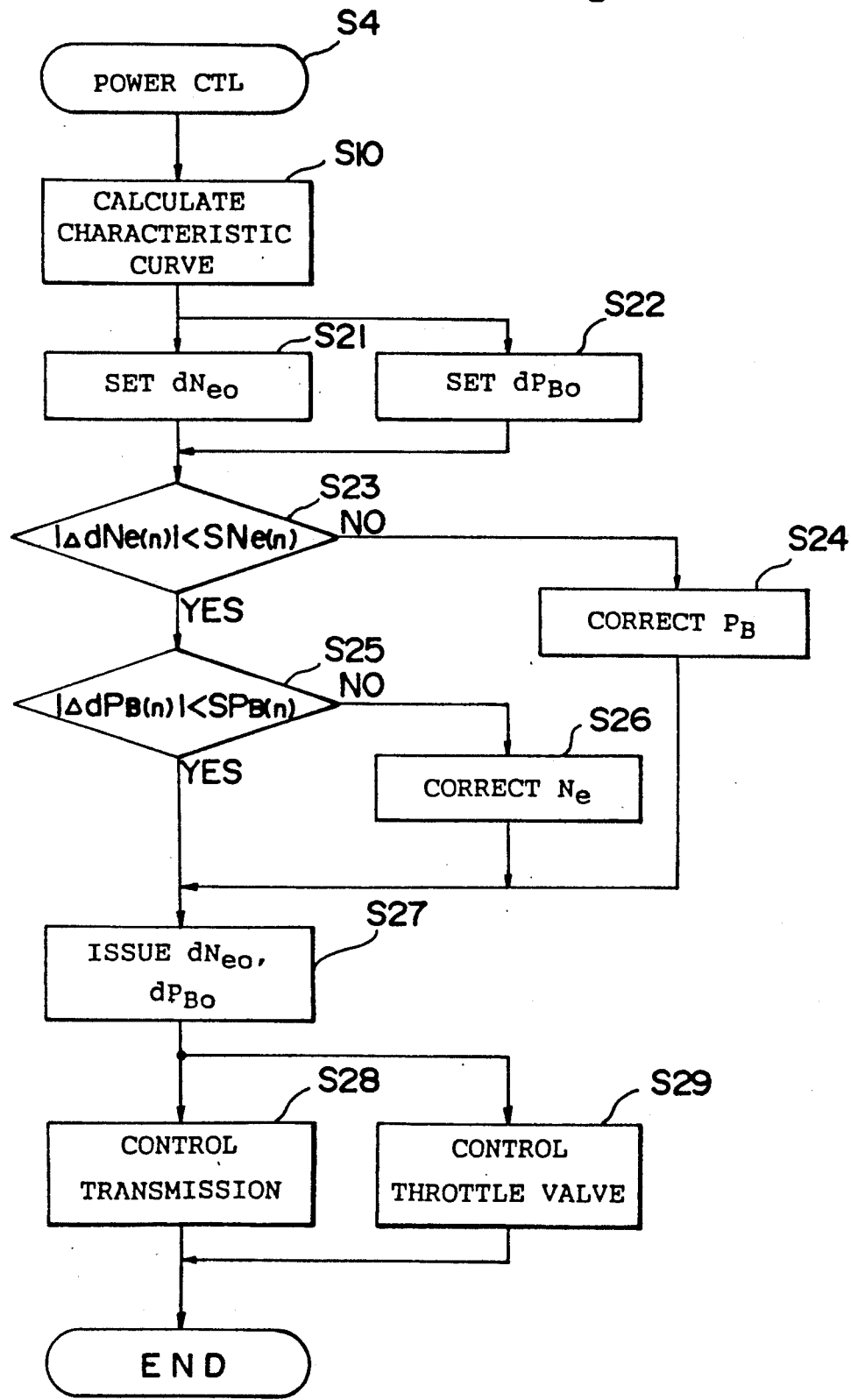
FIGS. 4 and 5 are flowcharts of a power control mode of the method of the invention.

After the engine output power changing curve has been determined, control then goes to steps S21, S22 in FIG. 4. In these steps, the engine output power is controlled so as to vary along the engine output power changing curve. Since the engine output power cannot directly be controlled, a target rate of change dNeO of the engine rotational speed and a target rate of change $P_{Bo}$ of the engine intake vacuum are set which cause the engine output power to vary along the output power changing curve.

Figure 7A:
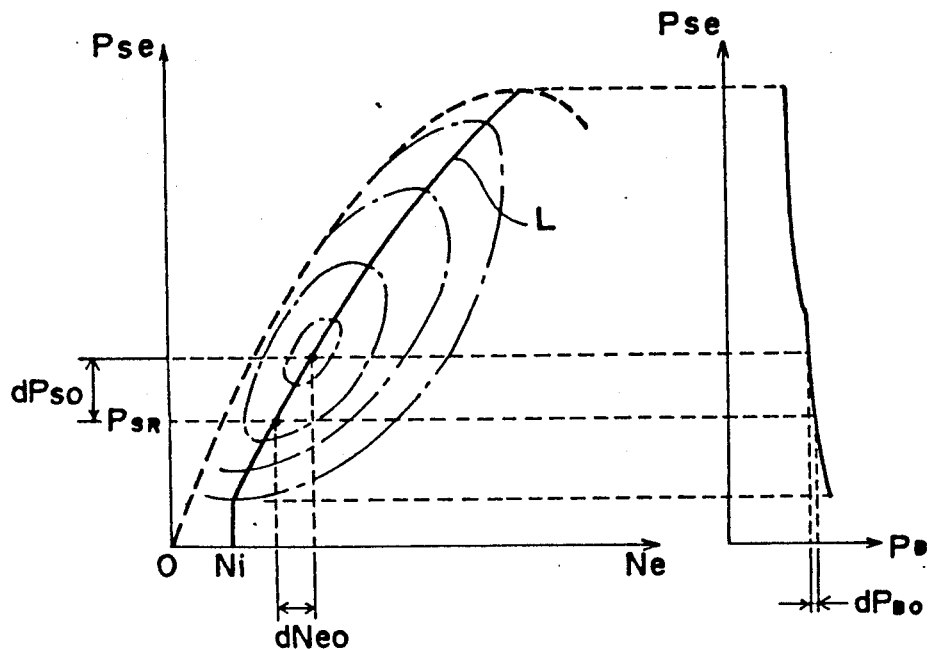
Figure 7B:

The setting of these target rates dNeO, $P_{Bo}$ will be described with reference to FIGS. 7A and 7B. The graph of FIG. 7A has a horizontal axis indicating the engine rotational speed and a vertical axis the engine output power. FIG. 7A shows a maximum engine output power line indicated by a broken line, isobase lines of the engine fuel consumption rate indicated by the dot-and-dash lines, and a minimum fuel consumption L indicated by a solid line. According to the control sequence of the present invention, the engine output power is basically controlled along the minimum fuel consumption curve L for better fuel economy. FIG. 7B shows engine intake vacuums $P_B$ corresponding to points on the minimum fuel consumption curve L.

Figure 7C:
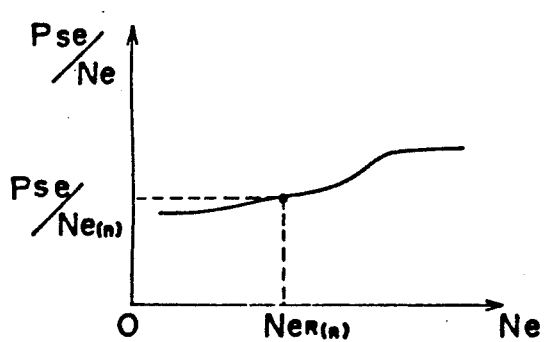
Figure 7D:
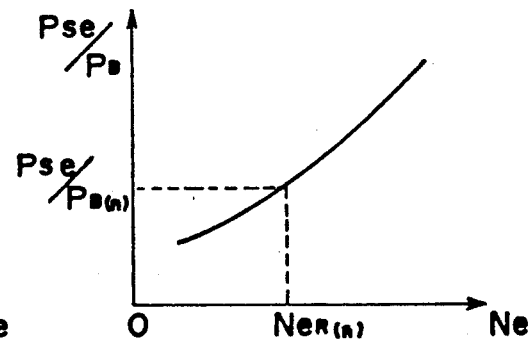

FIG. 7C is a graph, corresponding to FIG. 7A, having a horizontal axis indicating the engine rotational speed Ne and a vertical axis the gradient Pse/Ne of the engine output power with respect to the engine rotational speed on the minimum fuel consumption curve L. FIG. 7D illustrates a graph, corresponding to FIG. 7B, having a horizontal axis indicating the engine rotational speed Ne and a vertical axis the gradient Pse/$P_B$ of the engine output power with respect tot he engine intake vacuum on the minimum fuel consumption curve L.

If the target rate Pso(n) of the engine output power is set, as described above, then the gradient Pse/Ne(n) corresponding to the engine rotational speed Ne(n) at that time is determined from FIG. 7C, and the target rate of change dNeo(n) of the engine rotational speed, corresponding to the rate of change dPso(n) of the engine output power is determined rom:

$$dNeO(n)=dPso(n)/(Pse/Ne(n)).$$

Similarly, the gradient $Pse/P_B(n)$ corresponding to the engine output power $Ne(n)$ at this time is determined from FIG. 7D, and the target rate of change $dPBo(n)$ of the engine intake vacuum corresponding to the rate of change $dPso(n)$ of the engine output power is determined from:

$$dP_{Bo}(n) = dPso(n)/(Pse/P_B(n)).$$

Then, an actual change $dN_{eR}(n)$ in the engine rotational speed Ne during a time dt from the previous setting of a control value to the present setting of a control value is determined, and the difference $\Delta dNe(n)$ $(=dNeo(n-1)-dN_{eR}(n))$ between the previous target rate $dNeo(n-1)$ and the actual change $dN_{eR}(n)$ is determined. A step S23 determines whether the absolute value of the difference $\Delta dNe(n)$ is smaller than a threshold value $SNe(n)$ or not.

If $|\Delta dNe(n)| \geq = SNe(n)$, i.e., if the transmission control is insufficient due for example to a response delay of the control system, and the engine rotational speed does not vary to the target value, then control goes to a step S24 in which the target rate $dP_{Bo}$ of change of the engine intake vacuum $P_B$ is corrected to vary the engine output power toward the target value, i.e., along the engine output power changing curve.

If $|\Delta dNe(n)' < SNe(n)$, i.e., if the engine rotational speed has almost reached the target value, then control proceeds to a step S25 which determines an actual change $dP_{BR}(n)$ in the engine intake vacuum $P_B$ during a time dt from the previous setting of a control value to the present setting of a control value, determines the difference $\Delta dP_B(n)$ $(=dP_{Bo}(n-1)-dP_{BR}(n))$ between the previous target rate $dP_{Bo}(n-1)$, and the actual change $dP_{BR}(n)$, and determines whether the absolute value of the difference $\Delta dP_B(n)$ is smaller than a threshold value $S_{PB}(n)$ or not.

If $|\Delta P_B(n)| > SP_B(N)$, i.e., if the transmission control is sufficient but the throttle valve control is insufficient, then control goes to a step S26 in which the target rate of change $dNeo$ of the engine rotational speed Ne is corrected.

The correction of the target rate $dNeo$ will be described in detail below. In order to correct the target rate $dNeo$, an actual change $dPsr$ in the engine output power during a time dt from the previous control value setting to the present control value setting is determined, and the output power difference $\Delta Ps(n)$ between the actual change $dPsr$ and the previously set target rate $dPso(n-1)$ is determined.

If the transmission control is insufficient and the rate of change $dPBo$ of the engine intake vacuum is corrected to make up for a shortage of the output power difference $\Delta Ps(n)$, the gradient $Pse/PB$ of the engine output power with respect to the intake vacuum at the engine rotational speed Ne is read from the graph of FIG. 7D. Then, a corrective amount $P_B(c)$ is determined from the equation:

Corrective amount $P_B(c) = \Delta dPs(n)/(Pse/P_B)$.

The target rate of change $dPBo(n)$ of the intake vacuum is then corrected using the corrective amount $P_B(c)$ thus determined.

If the throttle valve control is insufficient and the target rate of change $dNeo$ of the engine rotational speed is corrected to make up for a shortage of the output power difference $\Delta Ps(n)$, the gradient $Pse/Ne$ of the engine output power with respect to the engine rotational speed at the engine rotational speed Ne is read from the graph of FIG. 7C. Then, a corrective amount $Ne(c)$ is determined from the equation:

Corrective amount $Ne(c) = \Delta dPs(n)/(Pse/Ne)$.

The target rate of change $dNeo$ of the engine rotational speed is then corrected using the corrective amount $Ne(c)$ thus determined.

The target rate of change $dNeo$ of the engine rotational speed and the target rate of change $dP_{Bo}$ of the engine intake vacuum, thus determined, are issued as control signals in a step S27. By using the control signals, the engine output power can be varied along the output power changing curve shown in FIG. 6F.

According to the control sequence of the present invention, the transmission and the throttle valve are controlled to vary the engine output power along the output power changing curve. If the actual engine output power deviates from the output power changing curve, then the transmission control and the throttle valve control are effected to correct any such engine output power deviation for better engine output power control.

After the target rate signals are produced, control then goes to steps S28, S29 in which the continuously variable transmission and the throttle valve are controlled simultaneously.

In the throttle valve control, operation of the throttle valve actuator 155 shown in FIG. 1 is controlled based on the target rate of change $dP_{Bo}$ of the engine intake vacuum.

In the transmission control, the target rate of change $dNeo$ of the engine rotational speed is put as the target rate of change $dNo/dt$ of the engine rotational speed in the equation (3), and the predicted acceleration $dVo/dt$ calculated from the reserved horsepower of the engine output power which corresponds to the throttle valve opening set by the throttle control is put in the equation (3) to calculate the rate of change $di/dt$ of the continuously variable transmission and the continuously variable transmission is controlled so as to vary at the rate $di/dt$.

Figure 8:
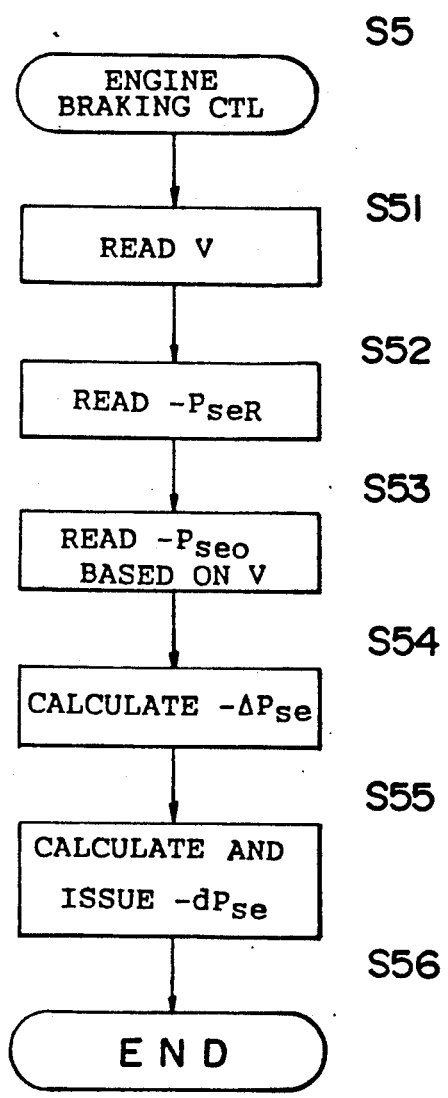
FIG. 8 is a flowchart of an engine braking control mode, of the method of the invention.

The engine braking control mode in a step S5 (FIG. 3) will be described below. The engine braking control mode is effected when the accelerator opening $\theta_{AP}$ is substantially fully closed. FIG. 8 is a flowchart of the sequence of the engine braking control mode.

Figure 9A:
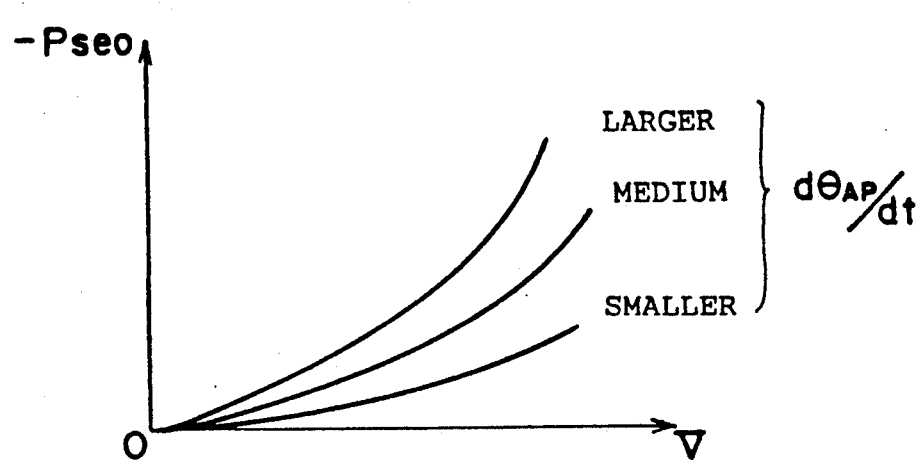
FIGS. 9A through 9C are graphs showing the characteristics of various signals used in the engine braking control mode.

A vehicle speed V is first read in a step S51, and an actual engine braking output power $-Pser$ at that time is read in a step S52. The engine braking output power is indicated with a negative sign because it acts in a direction opposite to the direction in which the motor vehicle driving power is applied. As shown in FIG. 9A, there is set a target engine braking output power $-Pseo$ which gives the driver a good running feeling corresponding to the vehicle speed. A target engine braking output power $-Pseo$ corresponding to the read vehicle speed V is read in a step S53. The target engine braking output power varies depending on the rate of change of the accelerator opening $\theta AP$. Even if the vehicle speed V is constant, when the rate of change $d\theta_{AP}/dt$ of the accelerator opening is large (i.e., the accelerator pedal is abruptly released), the target engine raking output opwer is large, and when the rate $d\theta_{AP}/dt$ is small, the target engine braking output power is small.

Figure 9B:
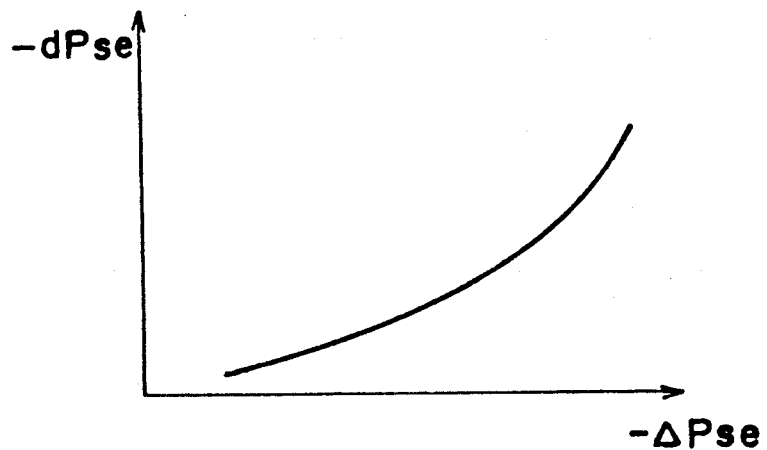

Then, the output power difference $-\Delta Pse$ between the actual engine braking output power $-Pser$ and the target engine braking output power $-Pseo$ is calculated in a step S54. A rate of change $-dPse$ of the engine braking output power which corresponds to the output power difference $-\Delta Pse$ is determined in a step S55 from the graph of FIG. 9B which shows the rate of change $-dPse$ of the engine braking output power that increases with the engine braking output power difference, as in FIG. 6D.

Figure 9C:
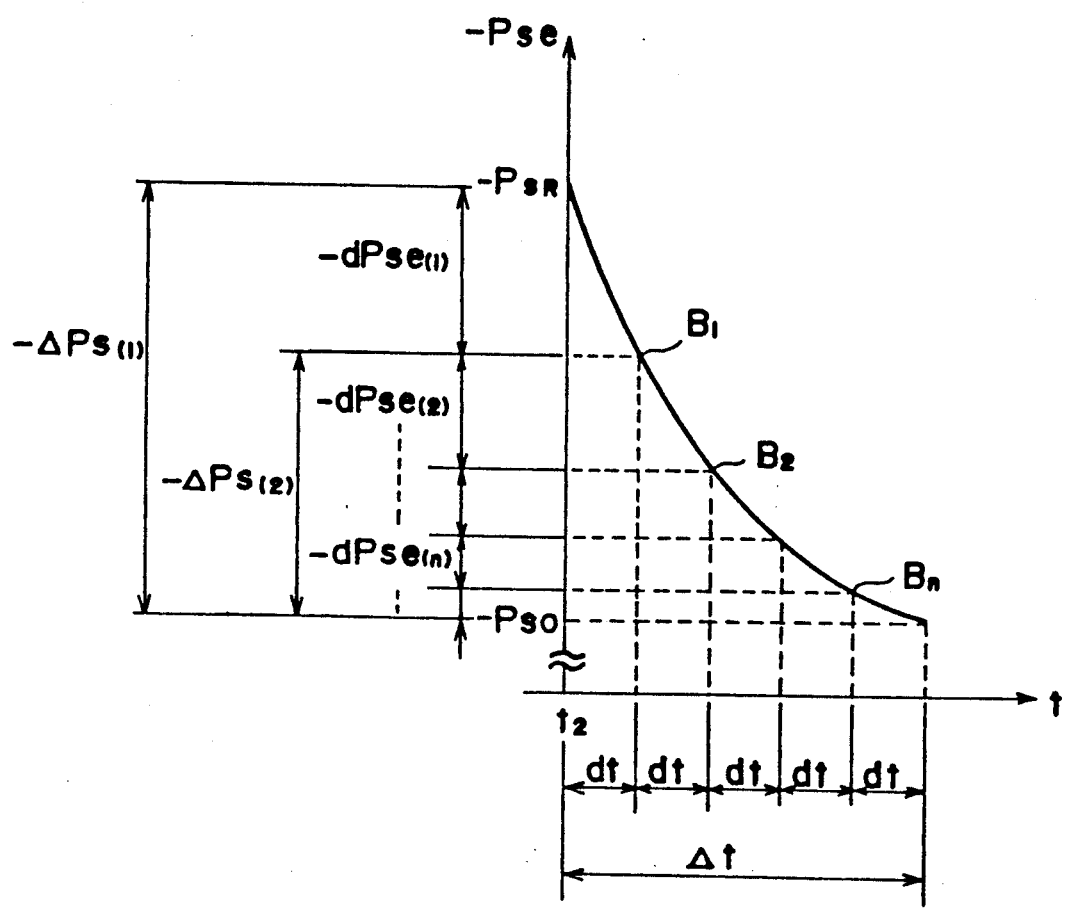

Based on the determined rate $-dPse$, there is established as shown in FIG. 9C an engine braking output power characteristic curve which shows a curve from the actual engine braking output power $-Pser$ to the target engine braking output power $-Pseo$. The engine braking output power characteristic curve is determined in substantially the same manner as with the characteristic curve shown in FIG. 6F. More specifically, a point B1 corresponding to an engine braking output power after elapse of a time dt is first determined from the rate $-dPse$ corresponding to the output power difference $-\Delta Pse$. Then, a rate of change of the engine braking output power which corresponds to the difference between the engine braking output power at the point B1 and the target engine braking output power is determined, and a point B2 indicative of an engine braking output power after elapse of a time dt is determined based on the above rate of change. The above process is repeated to determine the rate $-dPse(n)$ of change of the engine braking output power at each time interval dt as shown in FIG. 9C.

Thereafter, in order to obtain the rate of change $-dPse(n)$ of the engine braking output power, a target rate of change of the engine rotational speed and a target rate of change of the engine intake vacuum are determined. Then, the engine braking output power is controlled based on the determined rates. The control of the engine braking output power is similar to the control shown in FIGS. 7A-7D, and will not be described in detail. In the engine braking control mode, however, the curves shown in FIGS. 7C and 7D are established based on the relationship between the engine rotational speed and the engine output power while the engine braking is being applied.

Figure 10:
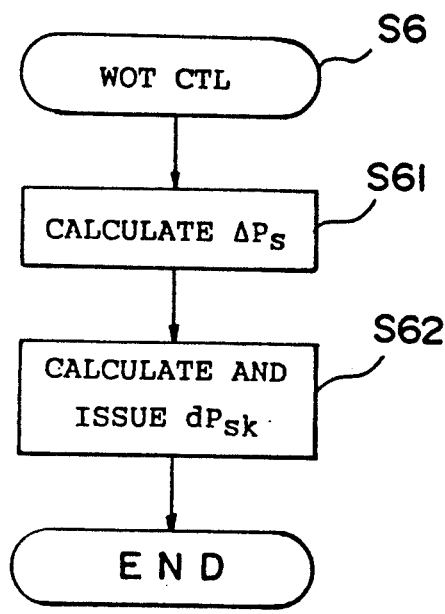
FIGS. 10 and 11 are flowcharts of a WOT (wide open throttle) control mode of the method of the invention.
Figure 12:
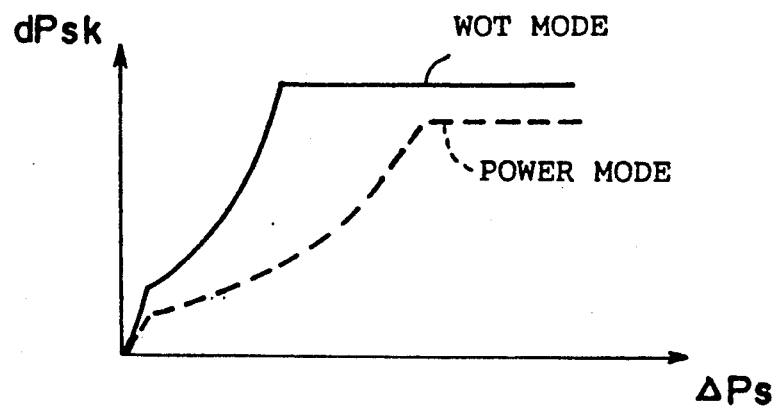
FIG. 12 is a graph illustrating the characteristics of various signals used in the WOT control mode.

The WOT control mode in a step S6 (FIG. 3) which is effected when the accelerator opening is substantially fully open will be described below with reference to FIG. 10. First, a step S61 determines the power difference $\Delta Ps$ between the actual engine output power $P_{sR}$ and the target engine output power Pso which is determined depending on the accelerator opening from FIG. 6A. Then, a rate of change $dP_{sk}$ of the engine output power which corresponds to the output power difference $\Delta Ps$ is read from the solid-line characteristic curve shown in FIG. 12, and a rate of change dNek of the engine rotational speed and a rate dPsk of change of the intake vacuum are determined to achieve the rate dPsK and are output in a step S62. The graph of FIG. 12 is established such that the rate of change dPsk of the engine output power will be larger than the rate of change (determined from the broken-line characteristic curve) in the engine output power in the power control mode (see the step S4 in FIG. 3). In the WOT control mode, the rate of change of the engine output power varies more sharply than in the power control mode.

The process of determining the rate of change dNek of the engine rotational speed and the rate of change $dP_{BK}$ of the intake vacuum with respect to the rate of change dPsk of the engine output power, and the transmission control and the throttle valve control based on the determined rates are exactly the same as those in the power control mode (the step S4), and will not be described below.

Figure 11:
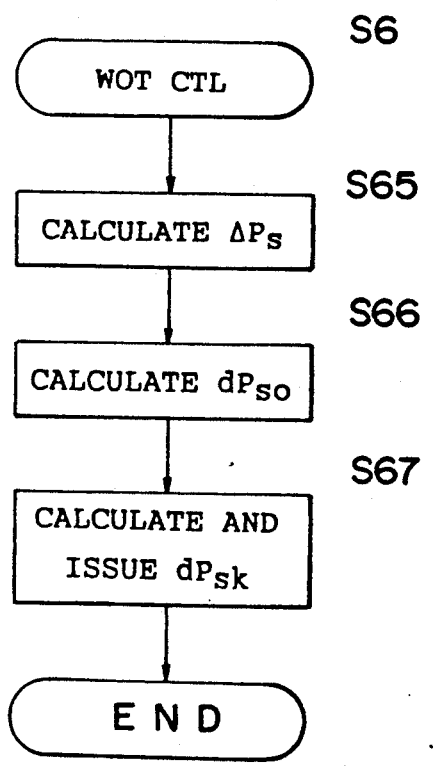

The WOT control mode may be carried out as shown in FIG. 11. In FIG. 11, the output power difference $\Delta Ps$ is determined in a step S65 in the same manner as in the step S61, and a rate of change dPsk of the engine output power corresponding to the output power difference $\Delta Ps$ is determined in a step S66 in the same manner as in the step S10 of the power control mode. The rate dPsk which is increased by adding a predetermined value $\Delta Pk$ is then used as a control value in a step S67. In this WOT control mode, the rate of change of the engine output power also varies more sharply than in the power control mode.

Figure 13:
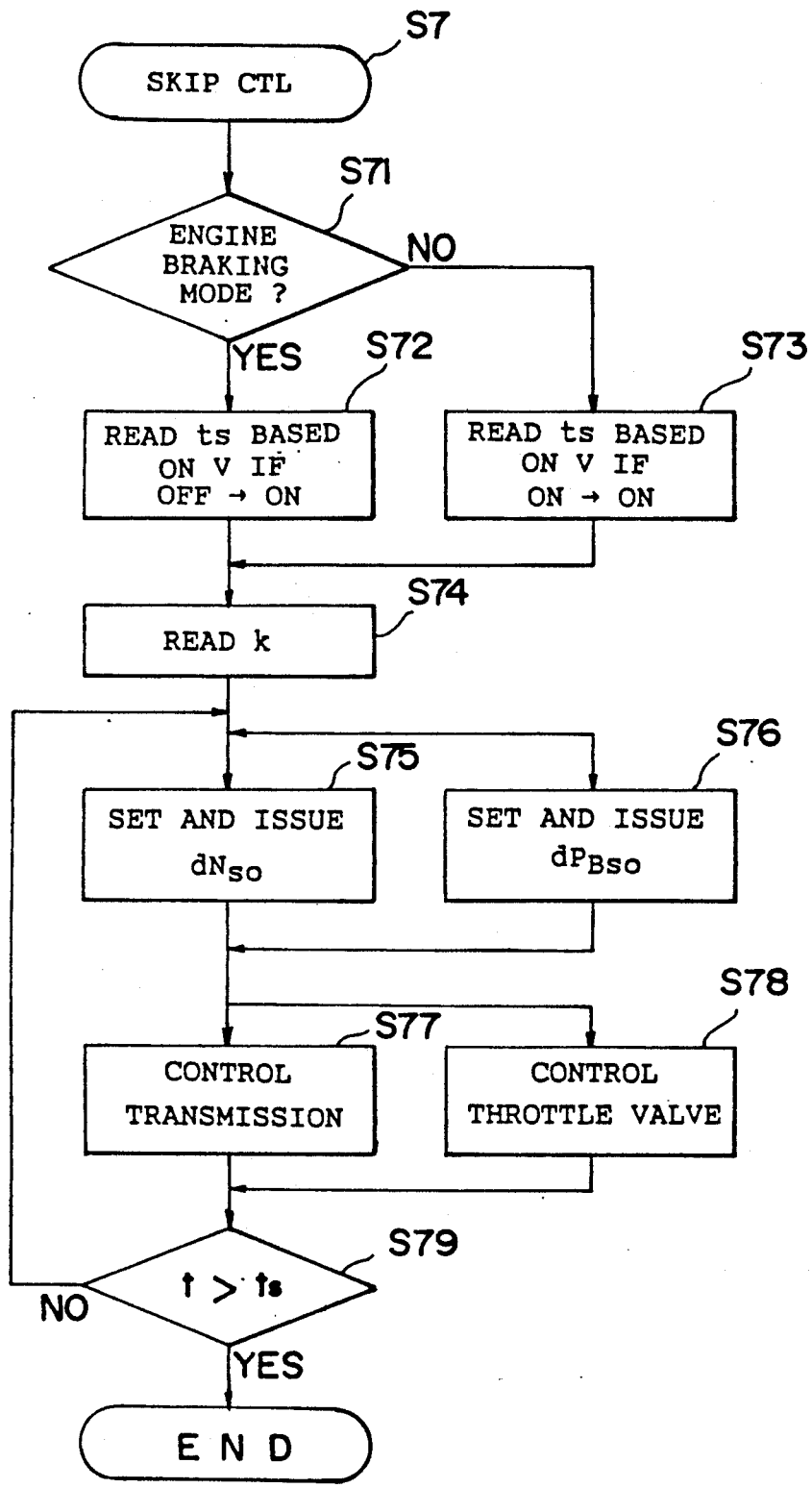
FIG. 13 is a flowchart of a skip control mode of the method of the invention.

The skip control mode in a step S7 (FIG. 3) is effected during an initial stage at the time the accelerator opening $\theta_{AT}$ varies, in order to prevent an operation delay during the initial stage. The skip control mode is illustrated in the flowchart of FIG. 13. The operation delay during the initial stage is caused by a time delay encountered before the actual control process is started after the accelerator opening $\theta$AP has started varying, and by play or lost motions in the transmission control system. The skip control mode is used to compensate for the operation delay for thereby preventing a loss of the driver's good feeling as to the running performance of the motor vehicle. The skip control mode starts being effected as an interrupt routine at substantially the same time as it is detected that the accelerator opening $\theta$AP starts to vary, and continues until the power control mode starts being effected, so that any adverse effect which is caused by a delay in the start of the power control mode will be eliminated. In the skip control mode, the target rate of change of the engine rotational speed is selected to be considerably high for thereby shortening a response delay time due to play or lost motions int he transmission control system.

The high target rate of change of the engine rotational speed is set in only a limited period of time its during the initial period since if the high target rate of change of the engine rotational speed were used for a longer period of time, the engine output power would vary too abruptly, resulting in shocks.

Figure 14A:
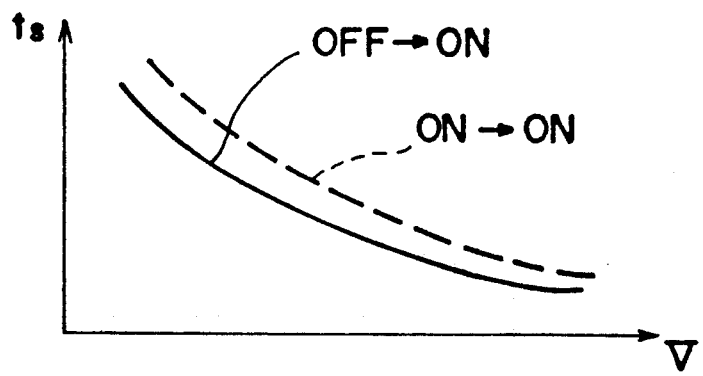
FIGS. 14A and 14B are graphs showing the characteristics of various signals used in the skip control mode.

The allowance for the operation delay is stricter when the accelerator opening varies from a somewhat open condition (ON) than when the accelerator opening varies from the fully closed (OFF) condition, and is also stricter when the vehicle speed is low. The time period ts during which the high target rate of change of the engine output power is set is therefore selected to be longer as the vehicle speed is lower as shown in FIG. 14A. In addition, the time period ts varies along a solid-line curve when the accelerator opening varies from the fully closed condition, and along a broken-line curve when the accelerator opening varies from the somewhat open condition.

A step S71 first determines whether the previous control mode has been the engine braking control mode or not, i.e., whether the accelerator pedal has been fully closed or not. If the previous mode has been the engine braking control mode, then since the accelerator opening varies form the fully closed condition, a time period ts corresponding to the vehicle speed is read from the solid-line curve shown in FIG. 14A in a step S72. Otherwise, a time period ts corresponding to the vehicle speed is read from the broken-line curve in a step S73.

Figure 14B:
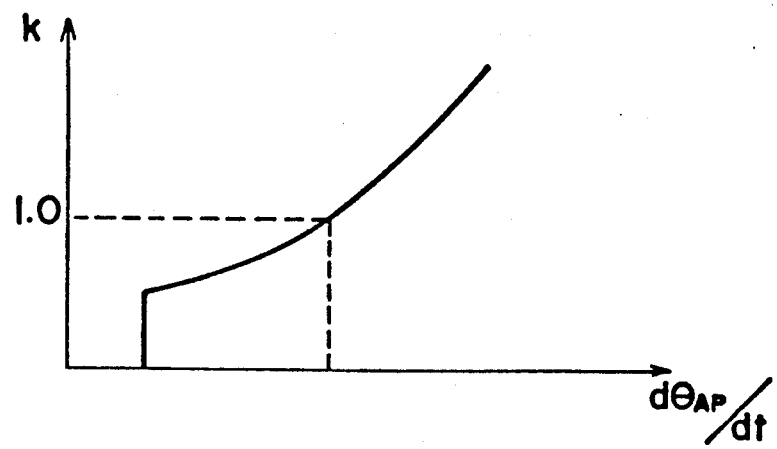

The allowance for the operation delay also varies dependent on the rate of change $d\theta_{AP}/dt$ of the accelerator opening $\theta_{QP}$, i.e., it is stricter as the rate is larger. Therefore, there is established as shown in FIG. 14B a corrective coefficient k which becomes greater as the rate of change $d\theta_{AP}/dt$ of the accelerator opening goes higher. The time period ts is multiplied by the corrective coefficient k so as to be corrected to meet a demand for the rate of change $d\theta_{AP}/dt$ of the accelerator opening in a step S74.

Thereafter, a target rate of change dNso of the engine rotational speed and a target rate of change $dP_{Bso}$ of the engine intake vacuum are set and issued in steps S75, S76. The target rate of change dNso of the engine rotational is set to a considerably high value, whereas the target ratio of change $dP_{Bso}$ of the intake vacuum is determined from the difference between the actual engine output power and the target engine output power as with the power control mode.

Based on the target rates thus determined, the transmission and the throttle valve are controlled in steps S77, S78. The transmission control and the throttle valve control will not be described in detail as they are the same in the power control mode (see the steps S28, S29 shown in FIG. 4)

At the same time that the skip control mode is started, a timer t starts counting time. A step S79 determines the count of the timer t has exceeded the time period ts or not. If t>ts, then the skip control mode is completed.

The control method of the present invention has been described as being applied to a continuously variable transmission which comprises a hydraulic pump and a hydraulic motor. However, the principles of the present invention are also applicable to any of various other types of continuously variable transmission.

With the present invention, as described above, an engine output power characteristic curve extending up to a target engine output power which corresponds to an accelerator opening is established based on the difference between the target engine output power and an actual engine output power. A target rate of change of an engine rotational speed and a target rate of change of an indication of an engine load are established along the engine output power characteristic curve, and the throttle valve and the transmission are controlled using the established target rates of change. When the accelerator pedal is operated, for example, a demand of the drier for an output power characteristic as expressed by the operation of the accelerator pedal is directly recognized as a demand for an increase or decrease in the engine output power. The transmission can appropriately be controlled in a manner to meet the demand of the driver.

The engine output characteristic curve is selected to provide the motor vehicle with running performance matching a driver's good driving feeling and achieving good fuel economy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a continuously variable transmission coupled to an output shaft of an engine having a throttle valve and mounted on a motor vehicle, comprising the steps of:
   detecting an indication of an intention of a driver of the motor vehicle for acceleration or deceleration;
   determining a target engine output power based on said indication, and according to a predetermined relation between said indication and said target engine output power;
   determining an actual engine output power;
   establishing a time-dependent engine output power changing curve for varying said actual engine output power to said target engine output power therealong, based on a difference between the target engine output power and the actual engine output power;
   determining a target rate of change of a rotational speed of the engine and a target rate of change of an engine load so that the actual engine output power varies along said time-dependent engine output power changing curve; and
   controlling the throttle valve and the continuously variable transmission based on said target rates.

2. A method according to claim 1, wherein said indication of intention of the driver for acceleration or deceleration is an accelerator depression.

3. A method according to claim 1, wherein said indication of the engine load is an intake vacuum pressure of the engine.

4. A method according to claim 1, wherein:
   a rate of change of the engine output power at a point on said time-dependent engine output power changing curve corresponds to a power difference between said target engine output power and an engine output power at said point.

5. A method according to claim 4, wherein:
   said rate of change of the engine output power at said point is so set as to be larger than a normal rate of change when the accelerator pedal of the motor vehicle is fully depressed to substantially fully open the throttle opening of the engine.

6. A method according to claim 1, wherein:
   said target rate of change of said rotational speed of the engine and said target rate of change of the engine load are further set so that the engine output power varies along a minimum fuel consumption curve of the engine.

7. A method according to claim 1, wherein:
   said throttle valve is controlled based on the target rate of change of the engine load by a throttle valve actuator which is operable by a control signal from a controller.

8. A method according to claim 1, wherein said continuously variable transmission has a hydraulic pump drivable by said engine and a hydraulic motor drivable by oil pressure supplied from said hydraulic pump, at least one of said hydraulic pump and said hydraulic motor being of a variable displacement type,
   said continuously variable transmission being controlled by controlling the variable displacement of said hydraulic pump or said hydraulic motor.

9. A method according to claim 1, wherein:
   a rate of change (di/dt) of the speed reduction ratio of the transmission is calculated based on a predicted acceleration (dVo/dt) calculated from a reserved horsepower of the engine and the target rate of change (dNo/dt) of the rotational speed of the engine, according to the following equation:

$$di/dt = -C_1 \cdot \frac{N}{V^2} \cdot dVO/dt + C_2 \cdot \frac{1}{V} \cdot dNo/dt,$$

where $C_1$ and $C_2$ are constant; and the continuously variable transmission is controlled based on said calculated rate of change (di/dt) of the speed reduction ratio.

10. A method according to claim 1, wherein:

said throttle valve is further controlled so as to correct a deviation of the actual engine output power from said engine output power changing curve when said deviation occurs because of insufficient controlling of the continuously variable transmission; and said continuously variable transmission is further controlled so as to correct a deviation of the actual engine output power from said engine output power changing curve when said deviation occurs because of insufficient controlling of the throttle valve.

11. A method according to claim 1, wherein:

said target rate of change of the rotational speed of the engine is modified so as to be of a higher value during a predetermined period of time after said indication of the intention of the driver for acceleration or deceleration is varied.

12. A method according to claim 11, wherein said indication of the intention of the driver for acceleration or deceleration is the throttle opening of the engine, said predetermined period of time being shorter when the throttle opening varies from a substantially fully closed condition than when the throttle opening varies otherwise.

13. A method according to claim 12, wherein said predetermined period of time is shorter as the rate of change of said throttle opening is greater.

14. A method according to claim 11, wherein said predetermined period of time is shorter as the speed of the motor vehicle is higher.

15. A method of controlling a continuously variable transmission coupled to an output shaft of an engine having a throttle valve and mounted on a motor vehicle, said motor vehicle having an accelerator pedal, said method being employed when said accelerator pedal is released to substantially close a throttle opening of said engine, comprising the steps of:

detecting an actual speed of the motor vehicle and a rate of change of an accelerator pedal depression;

determining a target engine braking output power based on said actual speed and said rate of change, and according to a predetermined relation among said target engine braking output power, said actual speed, and said rate of change;

determining an actual engine output power;

establishing a time-dependent engine output power changing curve for varying said actual engine output power to said target engine braking output opwer therealong, based on a difference between the target engine braking output power and the actual engine output power;

determining a target rate of change of a rotational speed of the engine and a target rate of change of an engine load so that the actual engine output power varies along said time-dependent engine output power changing curve; and controlling the throttle valve and the continuously variable transmission based on said target rates.

* * * * *